United States Patent [19]
Smrt

[11] 3,987,597
[45] Oct. 26, 1976

[54] MODULAR STRUCTURAL ASSEMBLY AND METHOD OF CONSTRUCTION

[76] Inventor: Thomas J. Smrt, 31W 300 W. Bartlett Road, Bartlett, Ill. 60103

[22] Filed: Jan. 26, 1976

[21] Appl. No.: 652,505

[52] U.S. Cl. .................................. 52/495; 52/63; 52/222; 52/741
[51] Int. Cl.² ..................................... E04B 1/347
[58] Field of Search ............ 52/481, 495, 63, 489, 52/502, 494, 222, 741; 160/378, 381, 394; 135/3 R, DIG. 1

[56] References Cited
UNITED STATES PATENTS

| | | | |
|---|---|---|---|
| 1,295,368 | 2/1919 | Pilkington | 52/222 |
| 3,127,926 | 4/1964 | Adelt | 160/371 |
| 3,213,585 | 10/1965 | Harry | 52/493 |
| 3,623,290 | 11/1971 | Downing | 52/481 |
| 3,759,001 | 9/1973 | Judkins | 52/481 |
| 3,950,869 | 4/1976 | Samarin | 160/378 |

*Primary Examiner*—John E. Murtagh

[57] ABSTRACT

A modular structural assembly is formed from a frame assembly and a plurality of rectangular panels which are releasably secured to the frame. Each panel is formed from four struts which are interconnected and a sheet which is stretched over the struts and secured thereto. Each strut includes an outwardly extending flange which is secured to the frame by clips mounted on the frame.

9 Claims, 8 Drawing Figures

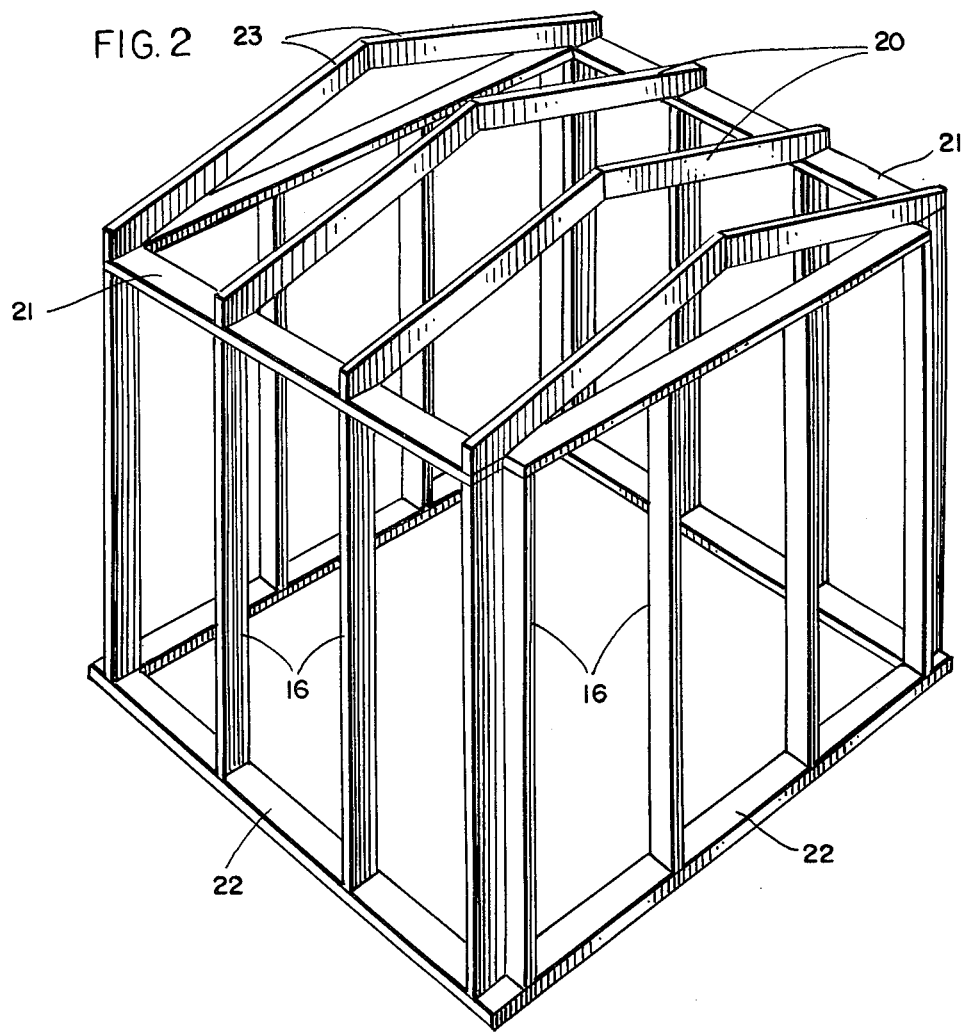
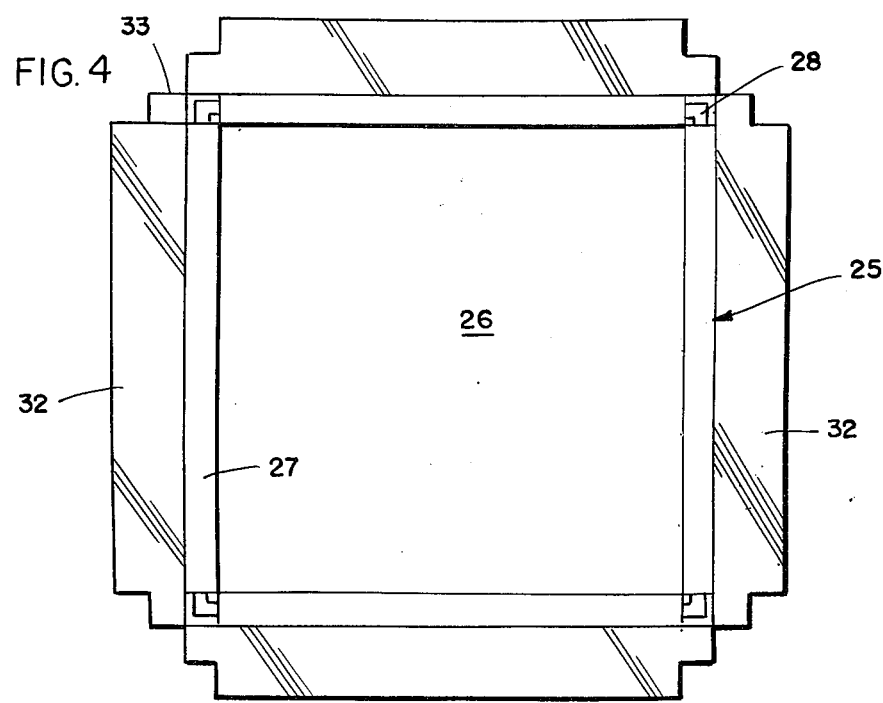

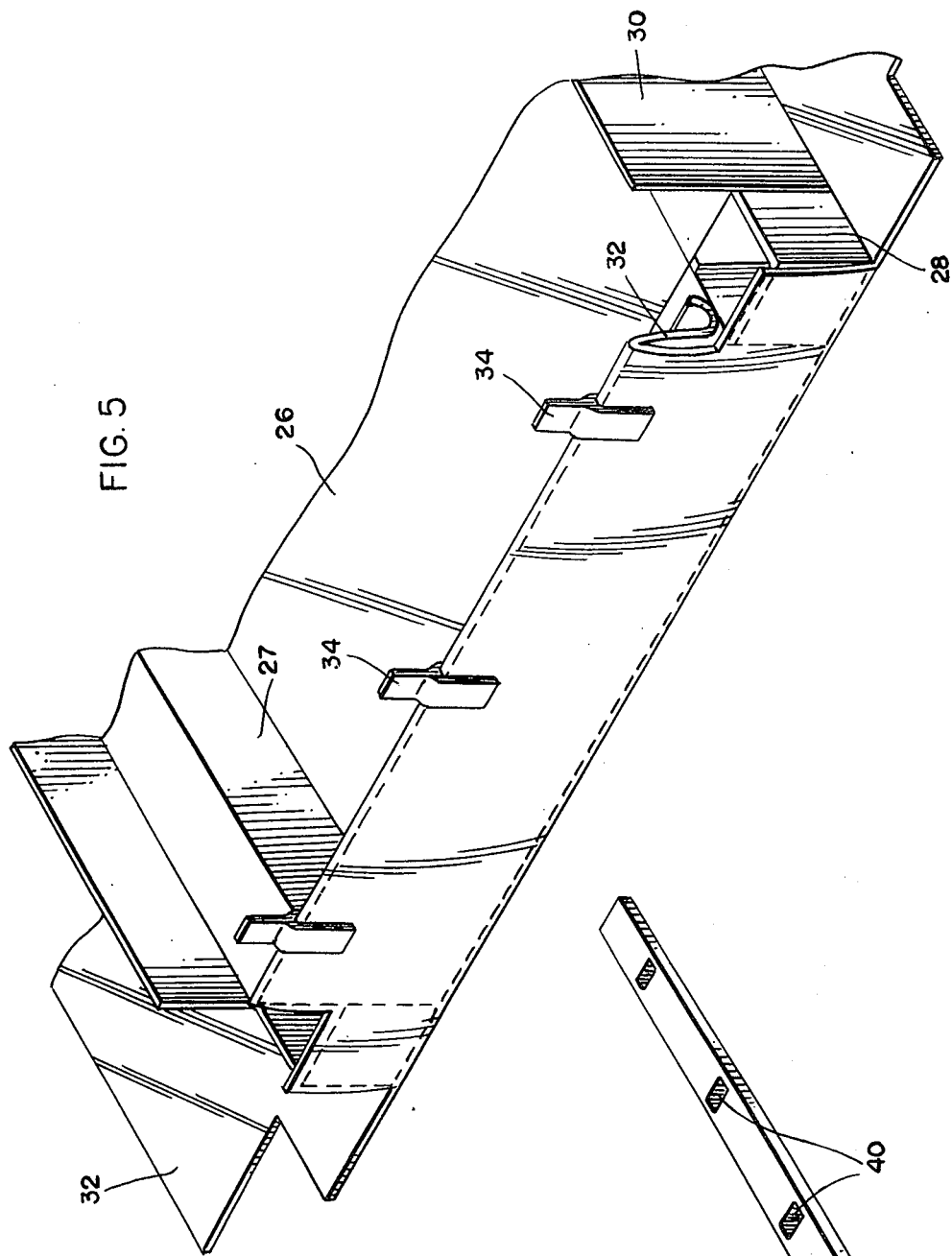

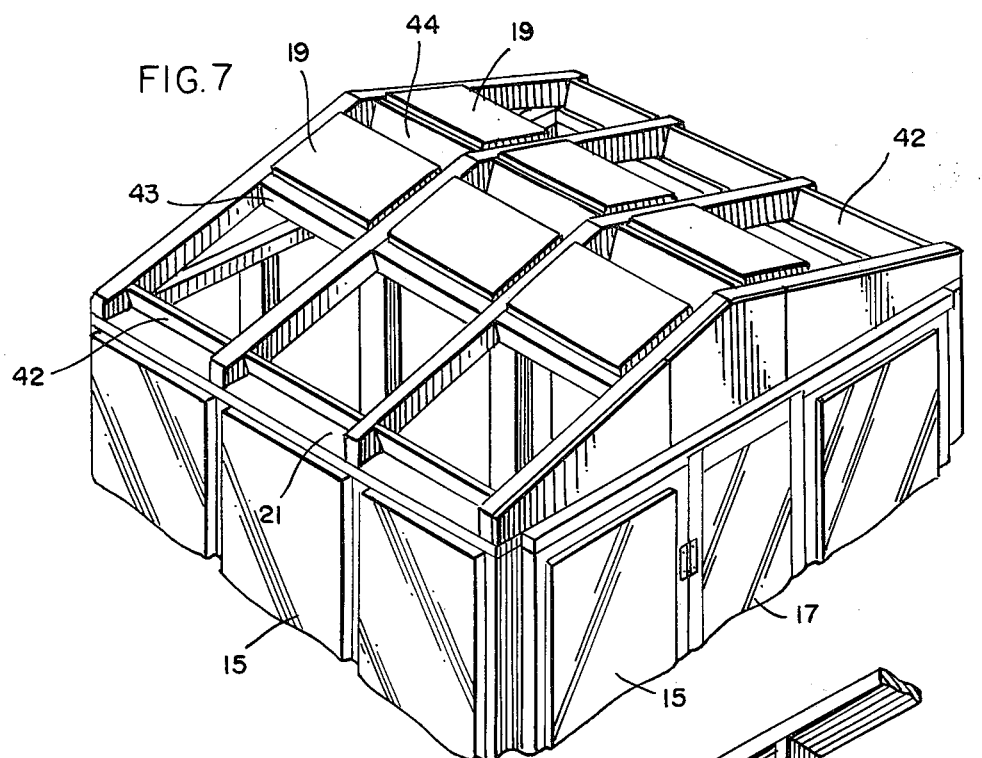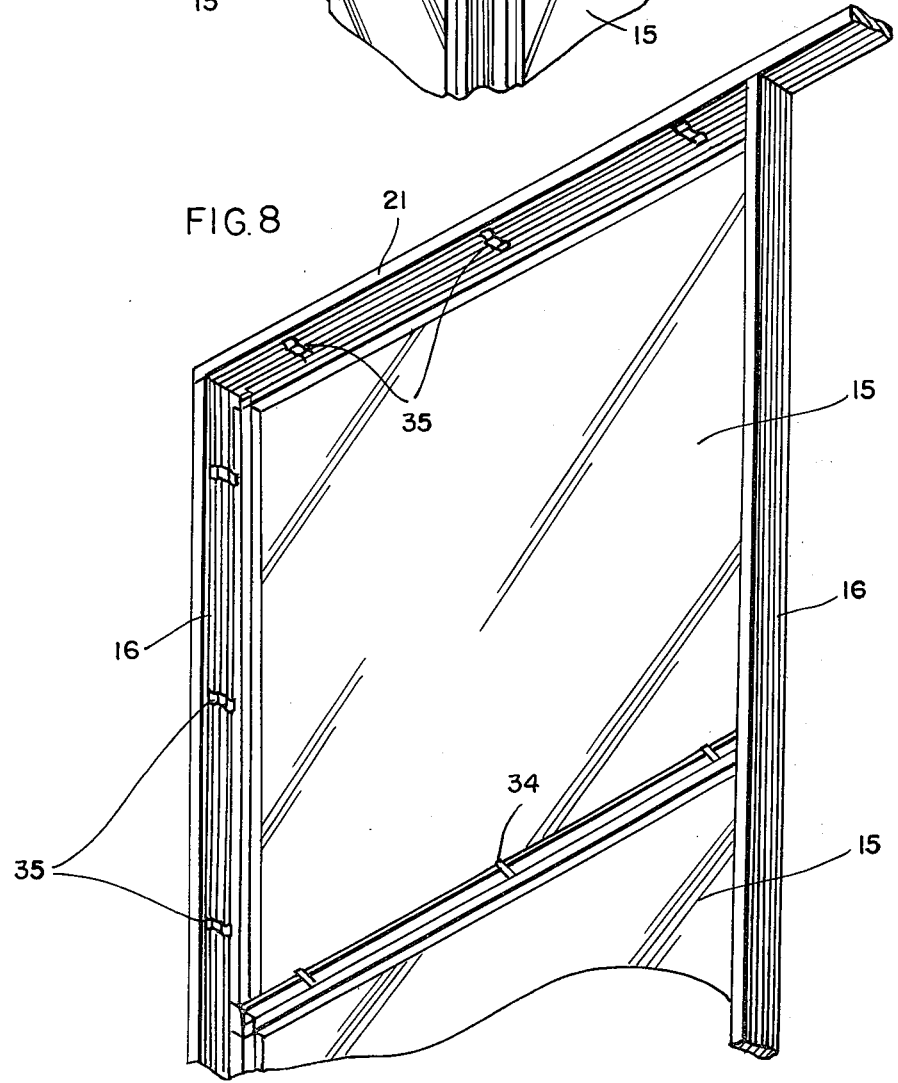

MODULAR STRUCTURAL ASSEMBLY AND METHOD OF CONSTRUCTION

BACKGROUND AND SUMMARY

This invention relates to a modular structural assembly, and, more particularly, to a modular structural assembly which utilizes lightweight panels which are easily assembled and easily attached to the frame of the structure.

Many types of enclosures or structures are advantageously provided in a do-it-yourself form so that a homeowner, for example, can purchase the components of the structure inexpensively and assembly it himself. If the structure is to be marketable in a knocked-down form, it should be capable of being assembled relatively quickly and easily without expert assistance while at the same time providing a completed structure which is both aesthetically pleasing and functional.

The invention provides a modular structural assembly which can be sold in a knocked-down form and which can be used to make a greenhouse or other enclosure. The assembly includes frame members which are connected to form an outer frame and panel struts and panel sheets which are used to form a plurality of rectangular panels. The panels are formed merely by interconnecting four struts to form a rectangular panel frame, stretching one of the sheets over the panel frame, and securing the sheet to the struts with removable clips. Thereafter, each panel is inserted between a pair of frame members and secured thereto by panel clips to form an enclosure. Although the panels are held firmly in place, the panels can be easily removed and replaced to repair damaged panels or to install panels with different sheet material. For example, some panels may use opaque or translucent plastic sheeting for light control, some panels may use mesh sheeting or screening for ventilation, or some panels may use colored plastic sheeting for decoration.

DESCRIPTION OF THE DRAWING

The invention will be explained in conjunction with an illustrative embodiment shown in the accompanying drawing, in which

FIG. 2 is a perspective view of the outer frame of the structural assembly;

FIG. 4 is a plan view of a panel frame placed over a panel sheet;

FIG. 5 is an enlarged fragmentary perspective view showing one edge of a panel sheet folded over and secured to the flange of one of the panel struts;

FIG. 6 is an exploded perspective view of one of the outer frame members and one of the panel clips;

FIG. 7 is a fragmentary perspective view similar to FIG. 1 showing the structure partially completed; and FIG. 8 is a fragmentary perspective view from inside of the structure of three frame members and a pair of adjacent panels positioned between and secured to the vertically extending frame members.

DESCRIPTION OF SPECIFIC EMBODIMENT

Figure 1:
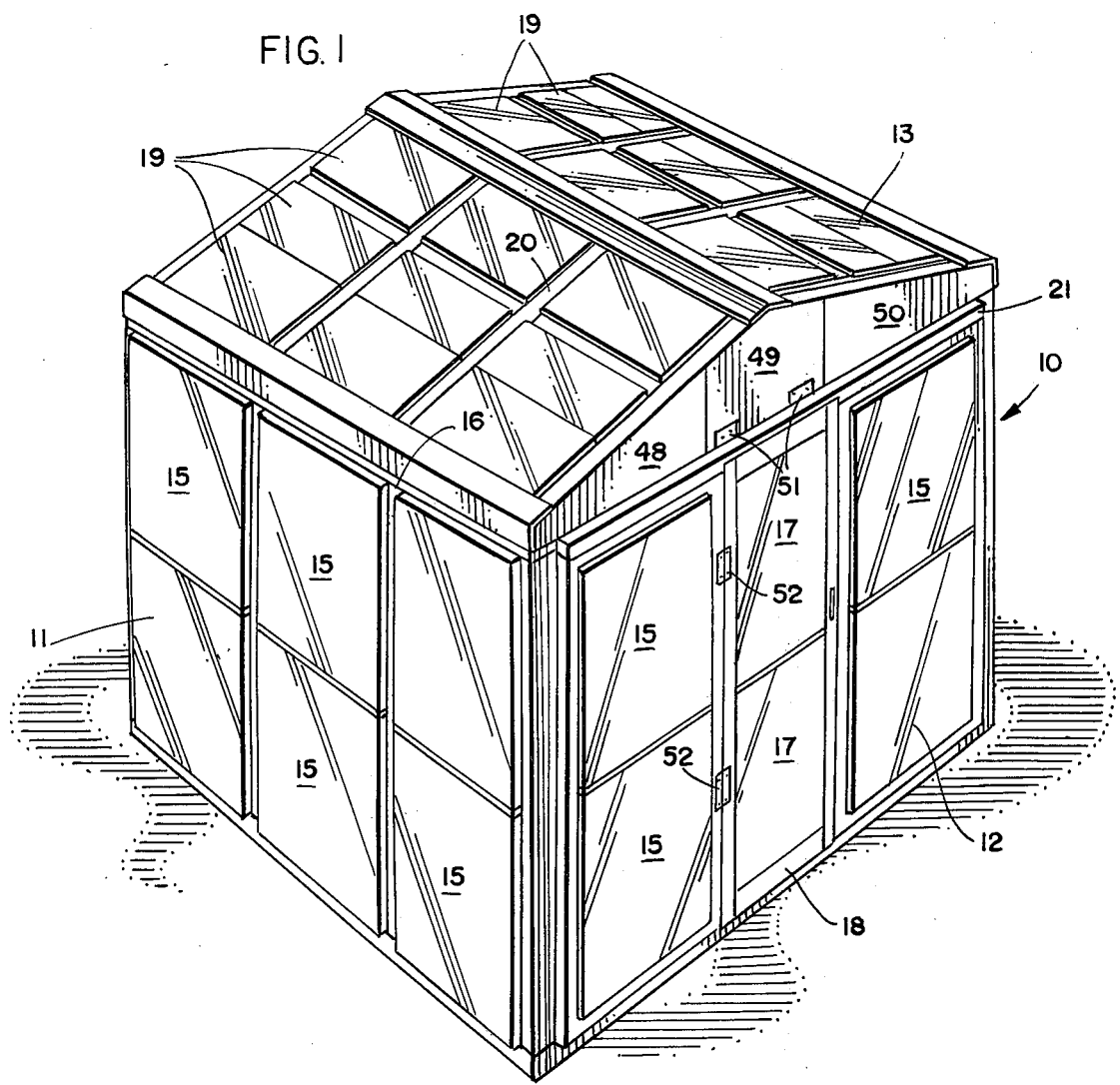
FIG. 1 is a perspective view of a modular structural assembly formed in accordance with the invention.

Referring first to FIG. 1, the numeral 10 designates generally a modular structural assembly which has a pair of side walls 11, a front wall 12, a rear wall (not shown), and a roof 13. A door 14 is provided in the front wall. Each wall is formed from a plurality of wall panels 15 which are secured between vertically extending frame members 16 (see also FIG. 2), and the door is formed from a pair of door panels 17 which are secured to a vertical door frame 18. The roof is formed from a plurality of roof panels 19 which are secured to rafters 20 (see also FIG. 2).

FIG. 2 illustrates the outer frame of the structure. Each of the four walls include vertically extending frame members or wood stringers 16 and top and bottom horizontally extending frame members 21 and 22 which form a rectangular frame. Each of the rafters 20 are formed from a pair of upwardly angled frame members 23 which are butted and nailed to each other and to horizontal frame members 21. In the particular embodiment illustrated the frame members 16 and 21–23 are formed from wood 2×4's.

Figure 3:
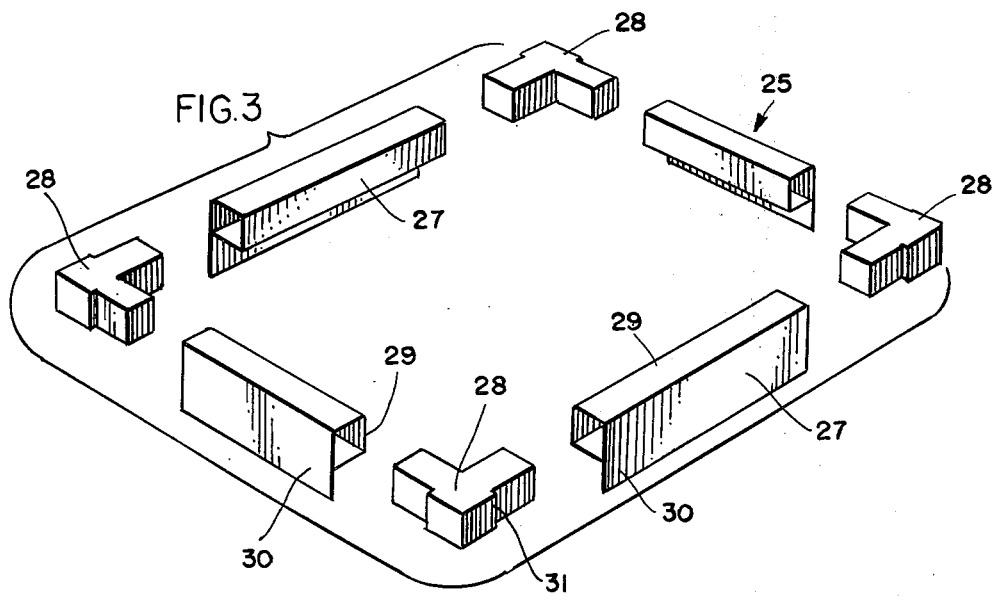
FIG. 3 is an exploded perspective view of the panel struts and connectors for one of the panels.

Referring now to FIGS. 3 and 5, each of the panels 15 is formed from a panel frame designated generally by the numeral 25 and a flexible sheet 26. Each panel frame includes four elongated tubular struts 27 which are interconnected by L-shaped connectors 28. Each of the struts includes a rectangular tubular body 29 and a longitudinally extending flange 30 which extends as a continuation of one of the sides of the struts. Each strut may advantageously be formed from a rectangular sheet of aluminum or sheet metal which is bent to form the tubular body and outwardly extending flange. The connectors 28 may be formed from molded plastic, and each of the connectors includes a pair of outwardly extending shoulders 31 for limiting the telescoping movement of the connector into the strut.

The plastic sheet 26 is sized to extend over the panel frame, and the panel is assembled by laying the sheet on a flat surface (FIG. 4) and placing the panel frame over the sheet. The side portions 32 of the sheet extend outwardly from the struts 27 sufficiently so that they can be folded over the top edges of the flanges 30 (FIG. 5), and the corners 33 of the sheet are cut out to eliminate double thicknesses of the folded sheet. Each of the folded side portions of the sheet are secured to the flange by U-shaped flange clips 34 formed from flexible and resilient plastic. After one edge of the sheet is secured, the opposite edge can be pulled over the strut to stretch the sheet taut and secured to the flange by flange clips.

A plurality of panel clips 35 (FIG. 6) are secured to each of the vertical frame members 16 and to the rafters 20. Each panel clip includes a central body portion 36 and a pair of curved end portions 37. The body portion is provided with a pair of holes 38, and the clip is secured to the frame member by nails or screws 39. The marked areas 40 on the frame member 16 in FIG. 6 indicate where the clips are to be secured.

The side panels 15 are inserted between a pair of vertical frame members 16 (FIG. 8) so that the flanges 30 on opposite vertical sides of the panel are inserted between the curved ends of the panel clips 35 and the frame members. The panel clips are formed of a flexible and resilient material, and the panels are thereby frictionally secured to the frame members. The top flange of the upper panel in FIG. 8 is similarly secured to the horizontal frame member 21. After the flanges are secured by the panel clips, the U-shaped flange clips 34 along the vertical sides and the top of the panel can be removed, and the panel sheet will remain clipped on the flanges by the panel clips 35. The adjacent flanges of the two vertically aligned panels in FIG. 8 can be secured by the U-shaped flange clips 34.

The panel clips 35 are double-ended, i.e., they have a pair of curved ends, and a second set of panels can be secured to the frame members from the other side of the frame to form a double-panelled structure for increased insulation. The U-shaped flange clips 34 can be left on the second set of panels.

The roof panels 19 are similarly secured to the rafters 20 by panel clips which are attached to the rafters. The particular roof illustrated in FIG. 1 includes three panels between each pair of rafters on each side of the roof, and three sets of cross beams 42, 43, and 44 (FIG. 7) are secured between the rafters on each side so that each roof panel is supported by panel clips along at least three sides. The roof can also be of a double-panelled construction as described with respect to the side walls.

The roof is completed by a V-shaped piece of aluminum flashing 45 (FIG. 1) and side strips 46 and 47 of wood, all of which are nailed to the rafters. The gables of the roof are enclosed by wood panels 48, 49, and 50. The center panel can be secured by hinges 51 for ventilation.

The door panels 17 are secured to the door frame 18 by panel clips as described with respect to the wall panels and roof panels, and the door frame is hingedly secured to one of the frame members 16 by hinges 52.

The modular structural assembly can be packaged and sold in a package which includes the molded plastic connectors 28, panel clips 35, flange clips 34, pre-cut rolled and formed struts of the lengths required to form the various panels, and pre-cut plastic sheets for the various sized panels. The wood frame members can either be supplied in the package, or the lumber can be acquired by the purchaser and cut to size in accordance with lumbe-utilization instructions.

Although the panels of the completed structure are firmly held in place by the panel clips, the panels may be easily removed and replaced to repair damaged panels or to install other panel materials or colors. For example, screening may be installed in some or all of the panels for ventilation, colored plastic may be used for decoration, and opaque or translucent plastic may be used for light control.

While in the foregong specification a detailed description of a specific embodiment of the invention was set forth for the purpose of illustration, it is to be understood that many of the details hereingiven may be varied considerably by those skilled in the art without departing from the spirit and scope of the invention.

I claim:

1. A modular structural assembly comprising an outer frame, a plurality of panels, and a plurality of clips for releasably securing the panels to the outer frame, the outer frame including a plurality of spaced-apart frame members, each panel comprising four struts connected to form a generally rectangular panel frame and a sheet secured to the struts, each strut including an elongated body and a longitudinally extending flange extending outwardly from the body, the sheet of each panel being folded over the flanges of the panel and being secured thereto, the clips being secured to the frame members and frictionally engaging the flanges of the panels.

2. The structure of claim 1 in which the body of each of the struts is tubular and adjacent struts of a panel are connected by an L-shaped connector which is inserted into each of the struts.

3. The structure of claim 1 in which each strut is formed from a rolled sheet of metal which is rolled to form a tubular body having a generally rectangular cross section and a flange which extends from one of the sides of the rectangular cross section.

4. The structure of claim 1 in which the sheet of each panel is secured to the flanges of at least three of the struts of the panel by said clips.

5. The structure of claim 1 in which some of the panels are bounded on three sides by frame members and are bounded on the fourth side by an adjacent panel, the flanges of adjacent struts of said adjacent panels being releasably secured together by clips.

6. A method of assembling a modular structural assembly comprising the steps of:
  a. erecting an outer frame having a plurality of spaced-apart frame members,
  b. forming a plurality of rectangular panel frames by interconnecting four struts, each of the struts having an elongated body and a longitudinally extending flange extending outwardly from the body,
  c. forming a plurality of panels by extending a sheet over each of the panel frames, folding the sheet over each flange of the panel, and securing the sheet to each flange, and
  d. inserting each panel between a pair of frame members and securing the panel thereto.

7. The method of claim 6 in which the sheet of each panel is secured to the flanges of the panel frame by inserting clips over the sheet and the flanges.

8. The method of claim 6 in which each panel is secured to the frame members by inserting at least two of the flanges of the panel into clips attached to the frame member.

9. The method of claim 6 in which the sheet of each panel is secured to the flanges of the panel frame by inserting flange clips over the sheet and the flanges and each panel is secured to the frame members by inserting at least two of the flanges of the panel into panel clips attached to the frame member, and removing at least some of the flange clips after the flanges are inserted into the panel clip.

\* \* \* \* \*